DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 712

T869,008

ALKEN-ω-YNYL PHOSPHINATE SYNERGISTS FOR CYCLOPROPANE-CARBOXYLATE INSECTICIDES

Ronald Eugene Montgomery, 46 S. Vernon St., Middleport, N.Y. 10940, and Harry Hobart Incho, 137 Ensign Ave., Medina, N.Y. 14103

Filed Mar. 27, 1969, Ser. No. 811,222
Int. Cl. A01n *9/36, 9/02*
U.S. Cl. 424—219
No Drawing. 14 Pages Specification

Synergistic insecticidal combinations of esters of cyclopropanecarboxylic acids, such as pyrethrins, allethrin, (1-cyclohexene-1,2 - dicarboximido)methyl chrysanthemumate, (5-benzyl-3-furyl)methyl 2,2,3,3-tetramethylcyclopropanecarboxylate and (5-benzyl-3-furyl)methyl chrysanthemumate, with certain 2-penten-4-ynyl diaryl phosphinates, as synergists, are described. The synergistic phosphinates have the general formula:

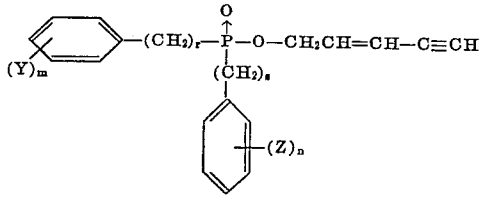

wherein Y and Z may each be halogen or methyl; *m* and *n* may each be an integer of 0 to 2 inclusive; and *r* and *s* may each be an integer of 0 to 1 inclusive. The preparation of 2-penten-4-ynyl diphenylphosphinate, M.P. 83.5–85.5°; and the synergistic activity of said phosphinate with representative chrysanthemumate insecticides, are described in detail.